(12) United States Patent
Karkos et al.

(10) Patent No.: US 10,557,361 B1
(45) Date of Patent: Feb. 11, 2020

(54) PLATFORM FOR AN AIRFOIL OF A GAS TURBINE ENGINE

(71) Applicant: United Technologies Corporation, Farmington, CT (US)

(72) Inventors: Peter Karkos, Old Saybrook, CT (US); Arun K. Theertham, Rocky Hill, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/161,585

(22) Filed: Oct. 16, 2018

(51) Int. Cl.
*F01D 11/00* (2006.01)
*F01D 5/30* (2006.01)
(Continued)

(52) U.S. Cl.
CPC ............ *F01D 11/008* (2013.01); *F01D 5/147* (2013.01); *F01D 5/3053* (2013.01); *B32B 7/12* (2013.01); *B32B 9/047* (2013.01); *B32B 2250/03* (2013.01); *B32B 2250/20* (2013.01); *B32B 2250/44* (2013.01); *B32B 2260/023* (2013.01); *B32B 2260/046* (2013.01); *B32B 2305/188* (2013.01); *B32B 2307/54* (2013.01); *B32B 2307/718* (2013.01); *B32B 2313/04* (2013.01); *B32B 2315/085* (2013.01); *B32B 2398/10* (2013.01); *B32B 2603/00* (2013.01); *F05D 2220/32* (2013.01); *F05D 2240/24* (2013.01); *F05D 2240/80* (2013.01);
(Continued)

(58) Field of Classification Search
CPC ...... F01D 11/008; F01D 5/147; F01D 5/3053; B32B 7/12; B32B 9/047; B32B 2250/03; B32B 2250/20; B32B 2250/44; B32B 2260/023; B32B 2260/046; B32B 2305/188; B32B 2307/54; B32B 2307/718; B32B 2313/04; B32B 2315/085; B32B 2398/10; B32B 2603/10; F05D 2220/32; F05D 2240/24; F05D 2240/80; F05D 2250/71; F05D 2300/224; F05D 2300/43; F05D 2300/6012; F05D 2300/603
See application file for complete search history.

(56) References Cited

U.S. PATENT DOCUMENTS 5,145,319 A 9/1992 Glowacki
8,827,650 B2 * 9/2014 Forgue .................. F01D 5/3007
416/193 A
(Continued)

*Primary Examiner* — Michael J Carey
*Assistant Examiner* — Ryan C Clark
(74) *Attorney, Agent, or Firm* — Cantor Colburn LLP

(57) ABSTRACT

Platforms for gas turbine engines are described. The platforms include a flow structure having a gaspath surface and a non-gaspath surface with a front end, a rear end, a first edge, and a second edge. A platform connector extends from the flow structure. A first layer forms a part of the gaspath surface and is a non-continuous layer terminating at the ends and the edges. A second layer forms a part of the platform connector and is a non-continuous layer terminating at the ends and the edges. The second layer contacts the first layer proximate the first and second edges. A third layer defines an internal void and is a continuous layer arranged between the first layer and the second layer and defines a part of the flow structure and a part of the platform connector.

20 Claims, 9 Drawing Sheets

(51) Int. Cl.
  *F01D 5/14* (2006.01)
  *B32B 7/12* (2006.01)
  *B32B 9/04* (2006.01)
(52) U.S. Cl.
  CPC .... *F05D 2250/71* (2013.01); *F05D 2300/224* (2013.01); *F05D 2300/43* (2013.01); *F05D 2300/603* (2013.01); *F05D 2300/6012* (2013.01)

(56) References Cited

U.S. PATENT DOCUMENTS

| | | | |
|---|---|---|---|
| 9,017,031 B2* | 4/2015 | Bottome | F01D 11/008 416/193 R |
| 9,145,784 B2* | 9/2015 | Evans | F01D 5/3092 |
| 10,344,601 B2* | 7/2019 | Turner | F01D 5/143 |
| 2014/0003949 A1* | 1/2014 | Adam | F01D 11/008 416/193 A |
| 2017/0022824 A1* | 1/2017 | Turner | F01D 5/225 |
| 2017/0145829 A1 | 5/2017 | Tatton | |
| 2017/0145838 A1* | 5/2017 | Tatton | F01D 5/326 |
| 2019/0162119 A1* | 5/2019 | Kling | F02K 3/062 |

\* cited by examiner

PLATFORM FOR AN AIRFOIL OF A GAS TURBINE ENGINE

BACKGROUND

The subject matter disclosed herein generally relates to airfoil platforms used in gas turbine engines and, more particularly, to airfoil platforms.

Gas turbine engines generally include a fan section, a compressor second, a combustor section, and turbine sections positioned along a centerline referred to as an "axis of rotation." The fan, compressor, and combustor sections add work to air (also referred to as "core gas") flowing through the engine. The turbine extracts work from the core gas flow to drive the fan and compressor sections. The fan, compressor, and turbine sections each include a series of stator and rotor assemblies. The stator assemblies, which do not rotate (but may have variable pitch vanes), increase the efficiency of the engine by guiding core gas flow into or out of the rotor assemblies.

The fan section includes a rotor assembly and a stator assembly. The rotor assembly of the fan includes a rotor disk and a plurality of outwardly extending rotor blades. Each rotor blade includes an airfoil portion, a dove-tailed root portion, and a platform. The airfoil portion extends through the flow path and interacts with the working medium gases to transfer energy between the rotor blade and working medium gases. The dove-tailed root portion engages attachment means of the rotor disk. The platform typically extends circumferentially from the rotor blade to a platform of an adjacent rotor blade. The platform is disposed radially between the airfoil portion and the root portion. The stator assembly includes a fan case, which circumscribes the rotor assembly in close proximity to the tips of the rotor blades.

To reduce the size and cost of the rotor blades, the platform size may be reduced and a separate fan blade platform may be attached to the rotor disk. To accommodate the separate fan blade platforms, outwardly extending tabs or lugs may be forged onto the rotor disk to enable attachment of the platforms. Improved rotor systems and/or platforms may be advantageous.

SUMMARY

According to some embodiments, platforms for gas turbine engines are provided. The platforms include a flow structure defining a gaspath surface and a non-gaspath surface, the flow structure extending between a front end and a rear end and between a first edge and a second edge, a platform connector extending from the non-gaspath surface, a first layer forming a part of the flow structure including the gaspath surface, the first layer being a non-continuous layer terminating at the front end, the rear end, the first edge, and the second edge, a second layer forming a part of the flow structure and a part of the platform connector, the second layer being a non-continuous layer terminating at the front end, the rear end, the first edge, and the second edge, wherein the second layer contacts the first layer proximate the first and second edges, and a third layer forming a part of the flow structure and defining an internal void, the third layer being a continuous layer arranged between the first layer and the second layer, wherein the third layer contacts the first layer to define a part of the flow structure, and the third layer contacts the second layer to define a part of the platform connector.

In addition to one or more of the features described above, or as an alternative, further embodiments of the platforms may include that at least one of the first layer, the second layer, and the third layer comprises one or more plies of material.

In addition to one or more of the features described above, or as an alternative, further embodiments of the platforms may include that the plies of material comprises at least one of carbon fiber weave, carbon fiber unidirectional fabric, fiberglass wave, fiberglass unidirectional fabric, poly-paraphenylene terephthalamide weaves and/or unidirectional fabric, synthetic polymers.

In addition to one or more of the features described above, or as an alternative, further embodiments of the platforms may include at least one support body arranged between at least two of the first layer, the second layer, and the third layer.

In addition to one or more of the features described above, or as an alternative, further embodiments of the platforms may include a support body arranged between each of the first layer, the second layer, and the third layer and forming part of the flow structure.

In addition to one or more of the features described above, or as an alternative, further embodiments of the platforms may include a support body arranged between the second layer and the third layer, wherein the support body forms a part of the platform connector.

In addition to one or more of the features described above, or as an alternative, further embodiments of the platforms may include that the support body includes a securing element configured to receive a locking pin.

In addition to one or more of the features described above, or as an alternative, further embodiments of the platforms may include a first support body arranged between each of the first layer, the second layer, and the third layer and forming part of the flow structure, and a second support body arranged between the second layer and the third layer.

In addition to one or more of the features described above, or as an alternative, further embodiments of the platforms may include that the first support body and the second support body are separate from each other at the rear end of the flow structure and are joined at the front end of the flow structure.

In addition to one or more of the features described above, or as an alternative, further embodiments of the platforms may include that the first support body and the second support body are a single unitary element that separates in a direction from the front end to the rear end.

In addition to one or more of the features described above, or as an alternative, further embodiments of the platforms may include that the at least one support body is formed of at least one of carbon fiber tows with a thermoset resin compound, fiberglass based chopped fiber with a thermoset resin compound (e.g., Bulk Molding Compound), carbon fiber based chopped fiber with a thermoset resin compound (e.g., Bulk Molding Compound), carbon fiber based discontinuous fiber with a thermoplastic resin compound, carbon fiber or fiberglass injection molded compound, metallics (e.g., steel, aluminum, titanium), foams, pure thermosets or thermoplastic injection molded compounds, and a honeycomb core.

In addition to one or more of the features described above, or as an alternative, further embodiments of the platforms may include at least one sealing layer attached to the second layer along a portion of at least one of the first edge and the second edge.

In addition to one or more of the features described above, or as an alternative, further embodiments of the platforms may include that the at least one sealing layer does not extend an entire length from the front end to the rear end and does not extend an entire length from the first edge to the second edge.

According to some embodiments, gas turbine engines are provided. The gas turbine engines include a rotor disk, an airfoil installed to the rotor disk, and a platform installed to the rotor disk adjacent the airfoil. The platform includes a flow structure defining a gaspath surface and a non-gaspath surface, the flow structure extending between a front end and a rear end and between a first edge and a second edge, a platform connector extending from the non-gaspath surface, the platform connector arranged to engage with the rotor disk, a first layer forming a part of the flow structure including the gaspath surface, the first layer being a non-continuous layer terminating at the front end, the rear end, the first edge, and the second edge, a second layer forming a part of the flow structure and a part of the platform connector, the second layer being a non-continuous layer terminating at the front end, the rear end, the first edge, and the second edge, wherein the second layer contacts the first layer proximate the first and second edges, and a third layer forming a part of the flow structure and defining an internal void, the third layer being a continuous layer arranged between the first layer and the second layer, wherein the third layer contacts the first layer to define a part of the flow structure, and the third layer contacts the second layer to define a part of the platform connector.

In addition to one or more of the features described above, or as an alternative, further embodiments of the gas turbine engines may include that at least one of the first layer, the second layer, and the third layer comprises one or more plies of material.

In addition to one or more of the features described above, or as an alternative, further embodiments of the gas turbine engines may include at least one support body arranged between at least two of the first layer, the second layer, and the third layer.

In addition to one or more of the features described above, or as an alternative, further embodiments of the gas turbine engines may include that the at least one support body includes a securing element configured to receive a locking pin.

In addition to one or more of the features described above, or as an alternative, further embodiments of the gas turbine engines may include a first support body arranged between each of the first layer, the second layer, and the third layer and forming part of the flow structure, and a second support body arranged between the second layer and the third layer.

In addition to one or more of the features described above, or as an alternative, further embodiments of the gas turbine engines may include that the first support body and the second support body are separate from each other at the rear end of the flow structure and are joined at the front end of the flow structure.

In addition to one or more of the features described above, or as an alternative, further embodiments of the gas turbine engines may include that the first support body and the second support body are a single unitary element that separates in a direction from the front end to the rear end.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Detailed descriptions of one or more embodiments of the disclosed apparatus and/or methods are presented herein by way of exemplification and not limitation with reference to the Figures.

Figure 1:
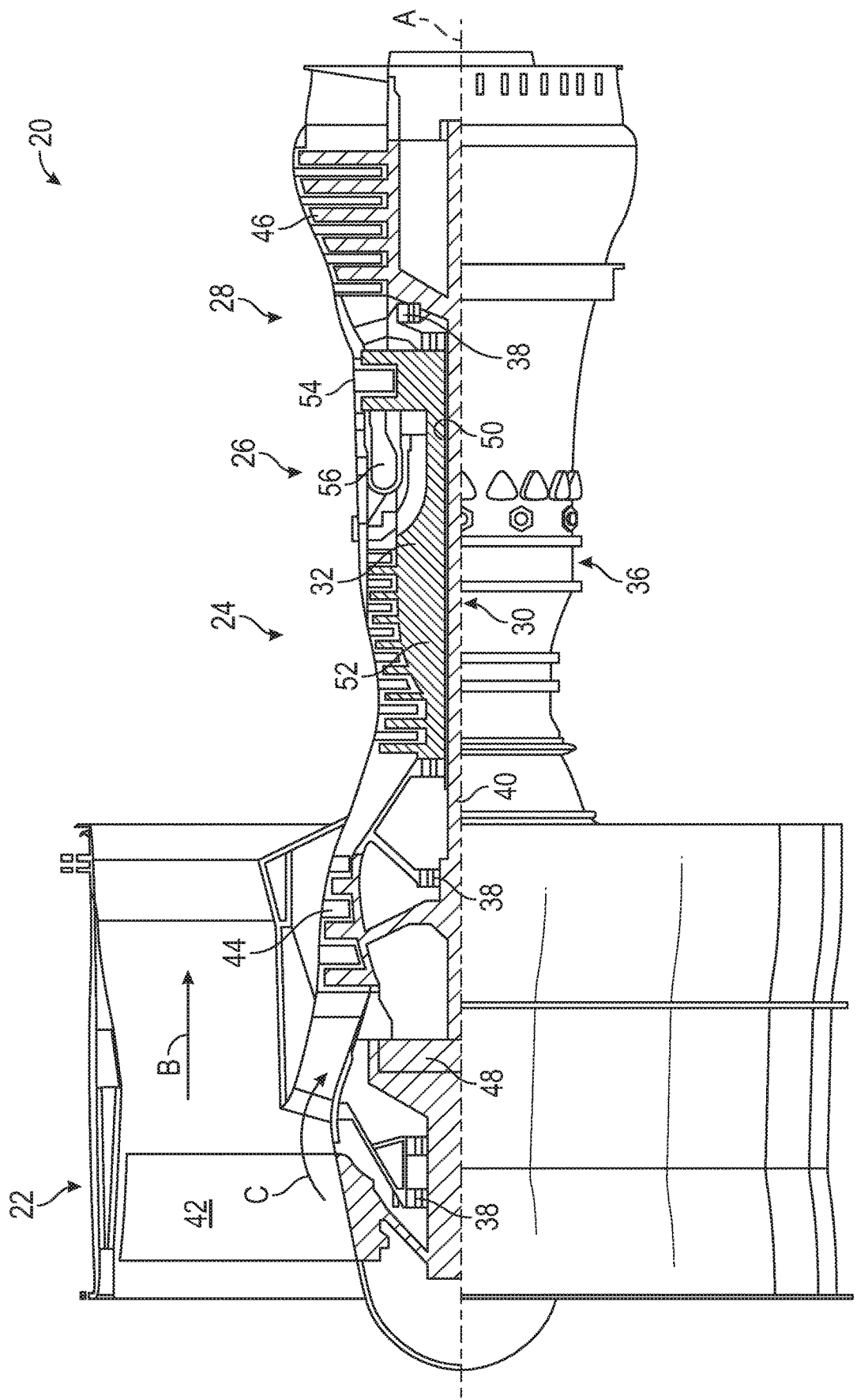
FIG. 1 is a schematic cross-sectional illustration of a gas turbine engine.

FIG. 1 schematically illustrates a gas turbine engine 20. The gas turbine engine 20 is disclosed herein as a turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 can be connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \degree R)/(514.7 OR)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets and turboshafts, wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
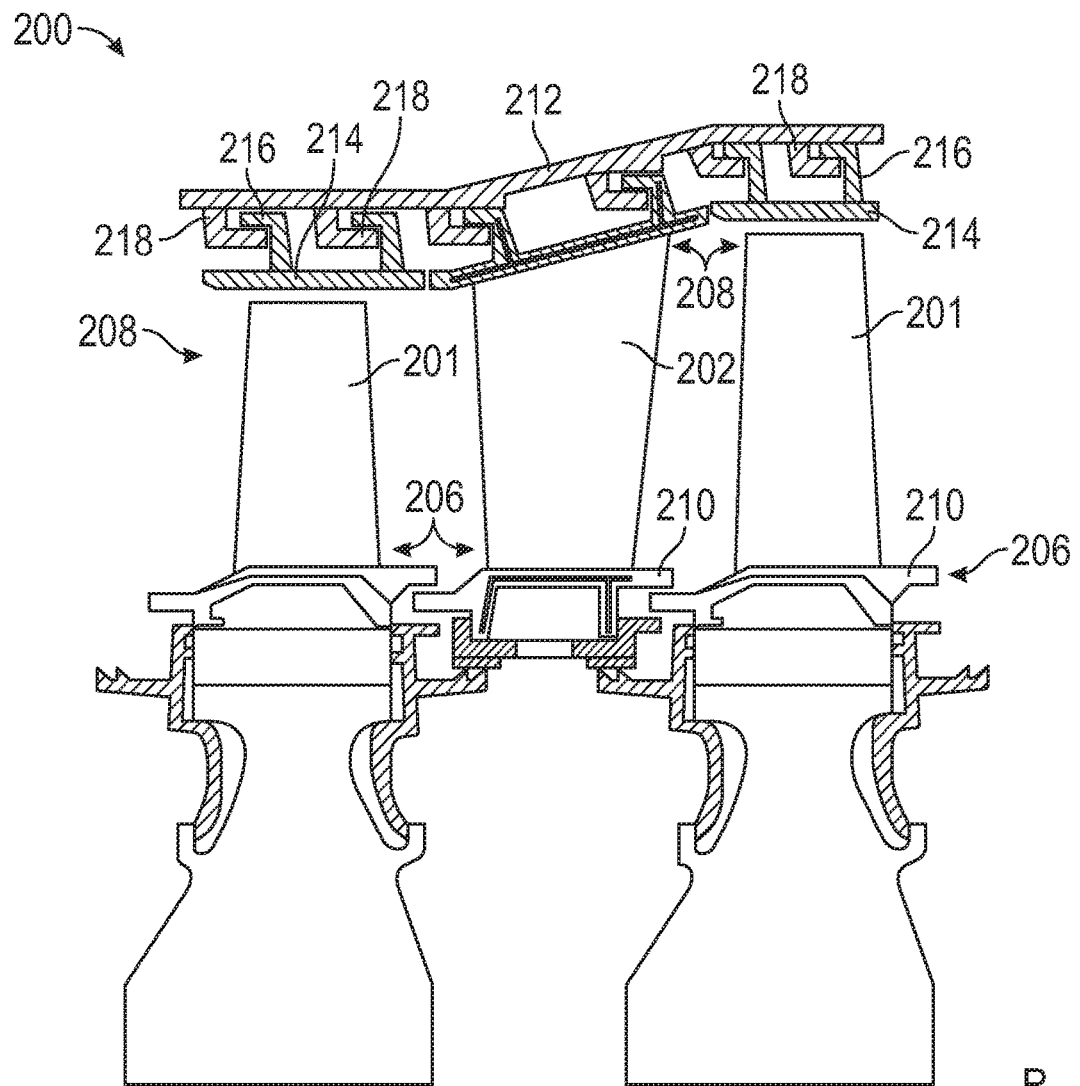
FIG. 2 is a schematic illustration of a portion of a turbine section of the gas turbine engine that may employ embodiments of the present disclosure.
Figure 2:
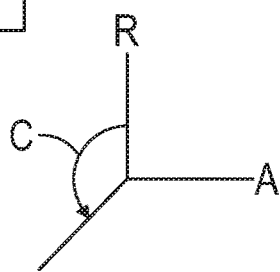

FIG. 2 is a schematic view of a turbine section that may employ various embodiments disclosed herein. Turbine 200 includes a plurality of airfoils, including, for example, one or more blades 201 and vanes 202 (generically "airfoil"). The airfoils 201, 202 may be hollow bodies with internal cavities defining a number of channels or cavities, hereinafter airfoil cavities, formed therein and extending from an inner diameter 206 to an outer diameter 208, or vice-versa. The airfoil cavities may be separated by partitions or internal walls or structures within the airfoils 201, 202 that may extend either from the inner diameter 206 or the outer diameter 208 of the airfoil 201, 202, or as partial sections therebetween. The partitions may extend for a portion of the length of the airfoil 201, 202, but may stop or end prior to forming a complete wall within the airfoil 201, 202. Multiple of the airfoil cavities may be fluidly connected and form a fluid path within the respective airfoil 201, 202. The blades 201 and the vanes 202, as shown, are airfoils that extend from platforms 210 located proximal to the inner diameter thereof. Located below the platforms 210 may be airflow ports and/or bleed orifices that enable air to bleed from the internal cavities of the airfoils 201, 202. A root of the airfoil may connect to or be part of the platform 210. Such roots may enable connection to a turbine disc, as will be appreciated by those of skill in the art.

The turbine 200 is housed within a case 212, which may have multiple parts (e.g., turbine case, diffuser case, etc.). In various locations, components, such as seals, may be positioned between the airfoils 201, 202 and the case 212. For example, as shown in FIG. 2, blade outer air seals 214 (hereafter "BOAS") are located radially outward from the blades 201. As will be appreciated by those of skill in the art, the BOAS 214 can include BOAS supports that are configured to fixedly connect or attach the BOAS 214 to the case 212 (e.g., the BOAS supports can be located between the BOAS and the case). As shown in FIG. 2, the case 212 includes a plurality of hooks 218 that engage with the hooks 216 to secure the BOAS 214 between the case 212 and a tip of the blade 201.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

Figure 3A:
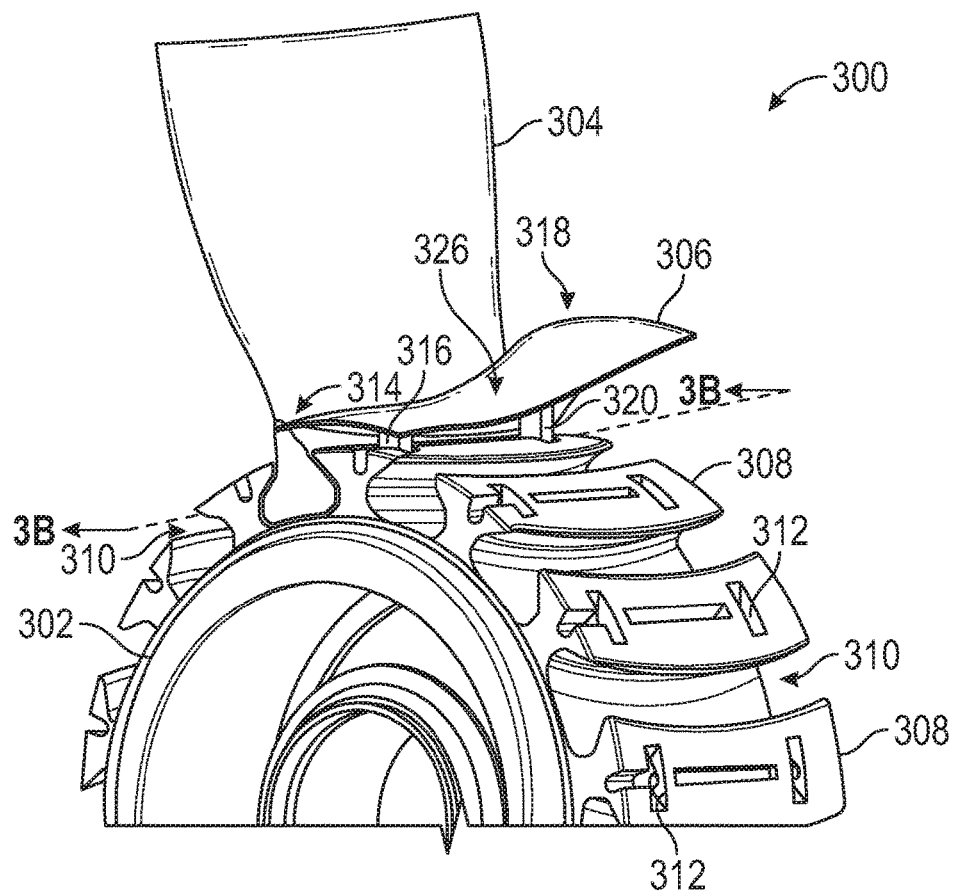
FIG. 3A is a schematic illustration of a rotor disk assembly that may employ embodiments of the present disclosure.
Figure 3B:
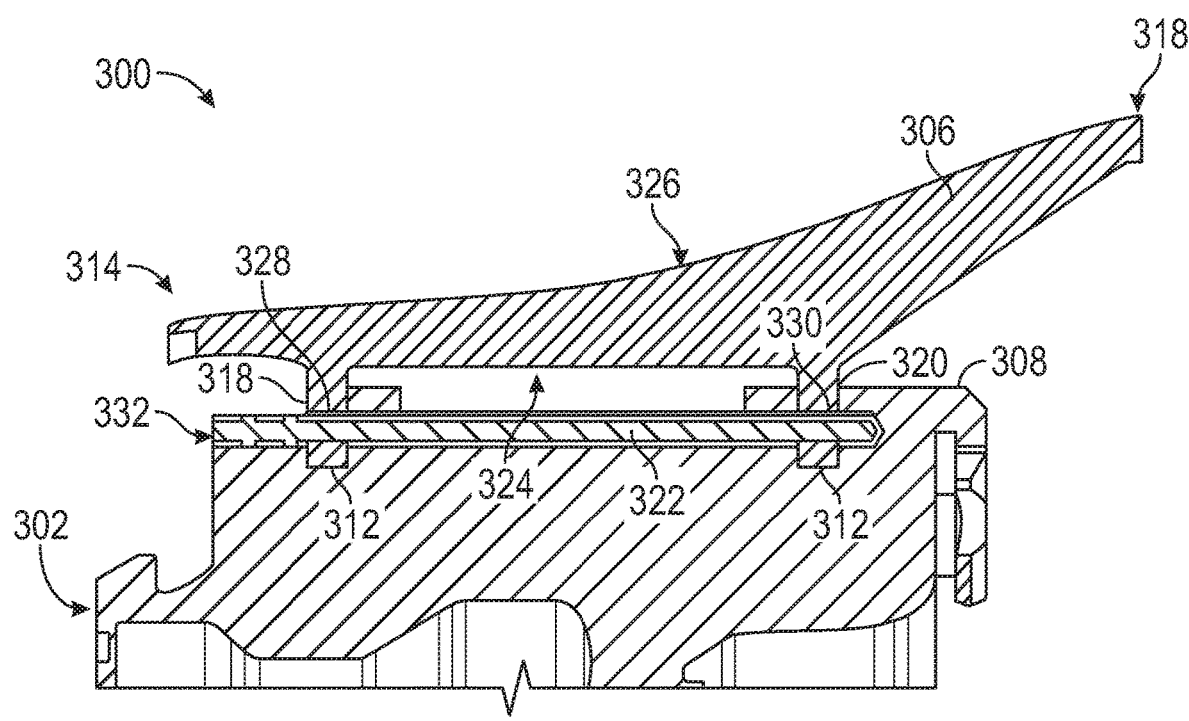
FIG. 3B is a cross-sectional illustration of a portion of the rotor disk assembly of FIG. 3A as viewed along the line 3B-3B.

Turning now to FIGS. 3A-3B, schematic illustrations of a rotor disk assembly 300 of a gas turbine engine are shown. FIG. 3A is an isometric illustration of the rotor disk assembly 300 and FIG. 3B is a cross-sectional view of the rotor disk assembly 300 as viewed along the line 3B-3B of FIG. 3A. The rotor disk assembly 300, as shown, includes a rotor disk 302, a blade 304, and a platform 306. The blade 304 may be a fan blade (e.g., for fan section 22 shown in FIG. 1) or a turbine blade (e.g., for a compressor section 24 or turbine section 28 shown in FIG. 1). Although shown with a single blade 304 and a single platform 306, those of skill in the art will appreciate that a number of blades and platforms are to be installed to the rotor disk 302 when installed into a gas turbine engine. Further, although a specific configuration and arrangement of elements is shown, those of skill in the art will appreciate that alternative arrangements are possible without departing from the scope of the present disclosure. That is, the present illustrations and discussion are merely for illustrative and explanatory purposes and are not intended to be limiting.

The rotor disk assembly 300 may be installed within a fan section of a gas turbine engine. As shown, the rotor disk 302 includes at least one attachment lug 308. The blade 304 is installed between two adjacent attachment lug 308 within a blade cavity 310. During installation of the fan section, the platform 306 is operably coupled to each of the attachment lug 308. As shown, each of the attachment lug 308 may include one or more slots 312 that are configured to receive a portion of a respective platform 306. For example, as shown, a front end 314 of the platform 306 may include a first connector 316 that may engage within a respective slot 312, and at rear end 318 of the platform 306, a second connector 320 may engage with a respective slot 312. A locking pin 322 may be used to provide removable attachment between the platform 306 and the attachment lug 308.

The first connector 316 and the second connector 320 extend from a non-gaspath surface 324 of the platform 306, as will be appreciated by those of skill in the art. Opposite the non-gaspath surface 324 of the platform 306 is a gaspath surface 326, which may be contoured as appreciated by those of skill in the art. Each of the connectors 316, 320 include securing elements 328, 330, respectively, defining apertures for attachment. To secure the platform 306 to a respective attachment lug 308, the first connector 316 is inserted into a respective slot 312 at the front end 314 and the second connector 320 is inserted into a respective slot 312 at the rear end 318. The locking pin 322 is inserted through an attachment aperture 332 to pass through each of the securing elements 328, 330 of the platform 306 and thus through the first connector 316 and the second connector 320.

New attachment lug designs and changes to the rotor disk or hub have resulted in changes in the geometry of platforms to be attached thereto. Composite materials may be used to form the platforms, such as laminated carbon composite structures. Wrapped fabric may be employed to form such composite platforms. The changes to the rotor disk or hub combined with high interlaminar effects due to deformation of the part under loading lead to a rethink on the overall design of platforms. It is desirable for the platform to reduce interlaminar effects. Further, due to reduced available space, platform design limits may be imposed.

Figure 4:
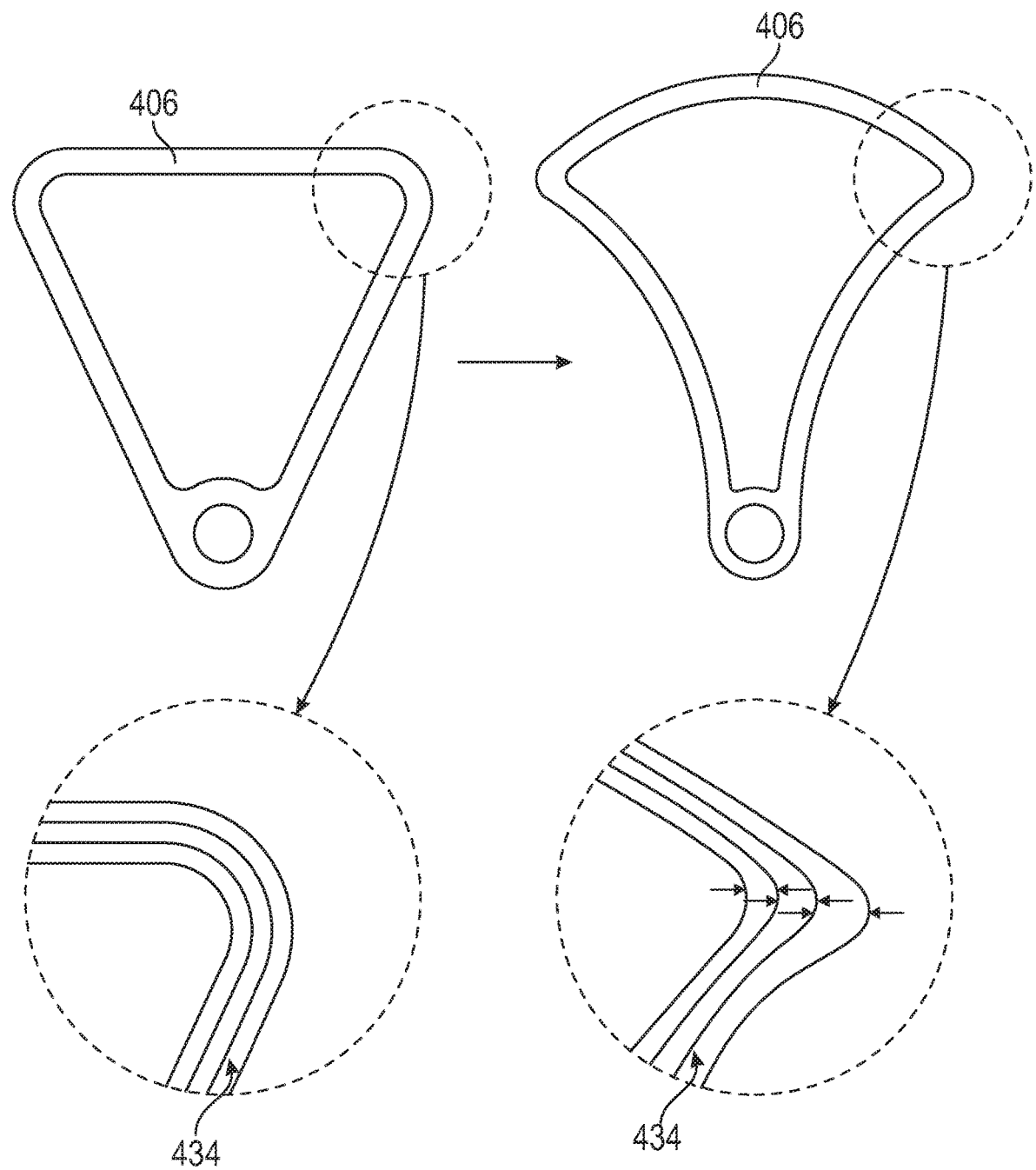
FIG. 4 is a schematic illustrations of a typical platform formed from laminated carbon composite structures are shown, illustrating a separation of plies.

Turning now to FIG. 4, schematic illustrations of a typical platform 406 formed from laminated carbon composite structures (i.e., plies or layers 434) are shown. The left side of FIG. 4 illustrates the platform 406 as installed, with the lower left image illustrative the configuration of the layers 434. However, due to interlaminar effects during operation, as shown on the right side of FIG. 4, the platform 406 may deform in shape, which may, in turn, cause ply separation of the layers 434. The ply separation may be undesirable, and thus alternative solutions are provided herein, wherein ply separation may be avoided.

In accordance with embodiments of the present disclosure, topology optimization analyses were performed to understand how a given flow path surface would best attach itself to a pinned hole under inertial loading (i.e., platform & hub configuration). These results were translated into how a composite part can be designed and manufactured. The resulting composite shape in accordance with embodiments of the present disclosure has been analyzed and found to be efficient in eliminating the interlaminar effects described above.

Figure 5A:
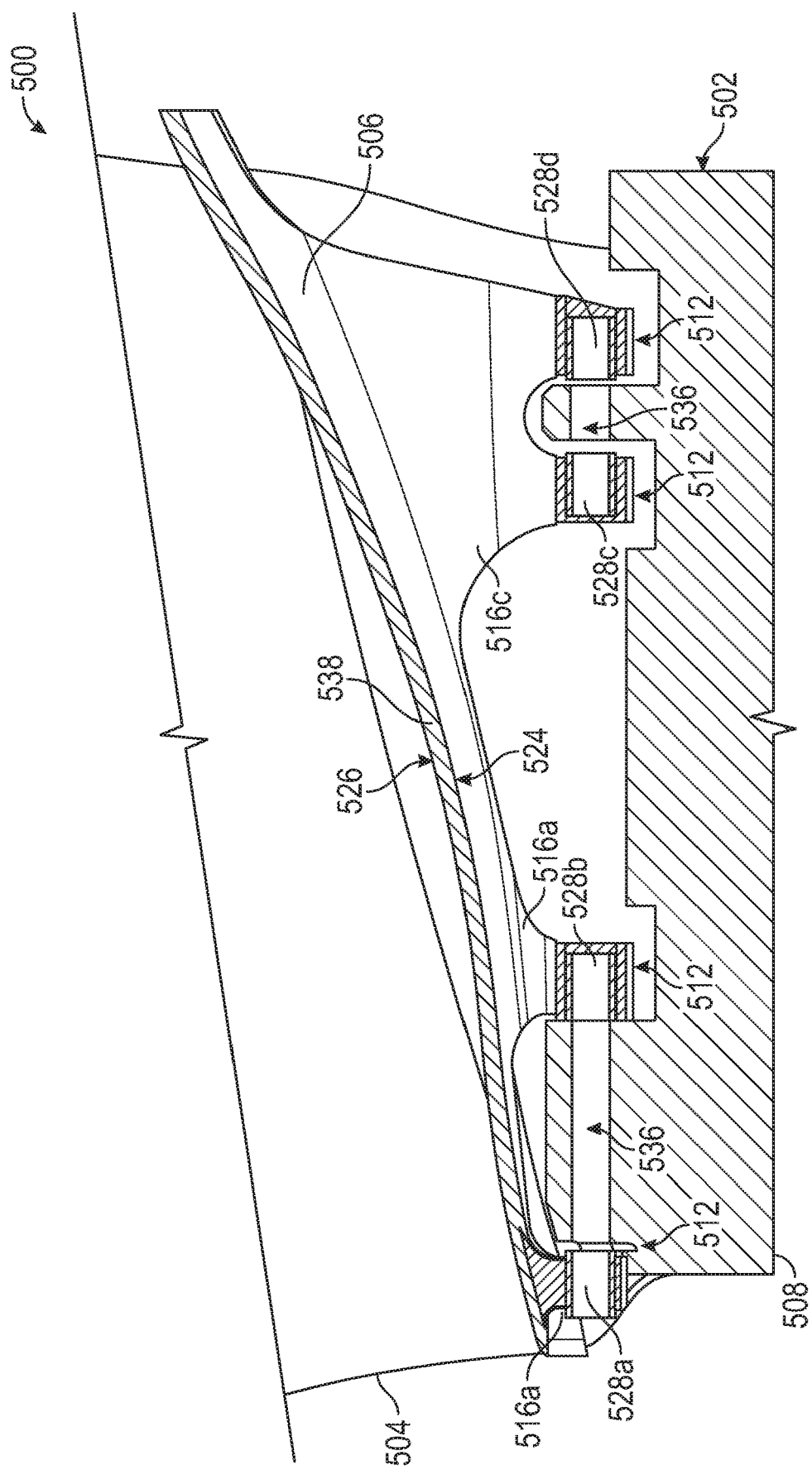
FIG. 5A is a side elevation, partial cross-sectional illustration of a rotor disk assembly in accordance with an embodiment of the present disclosure.
Figure 5B:
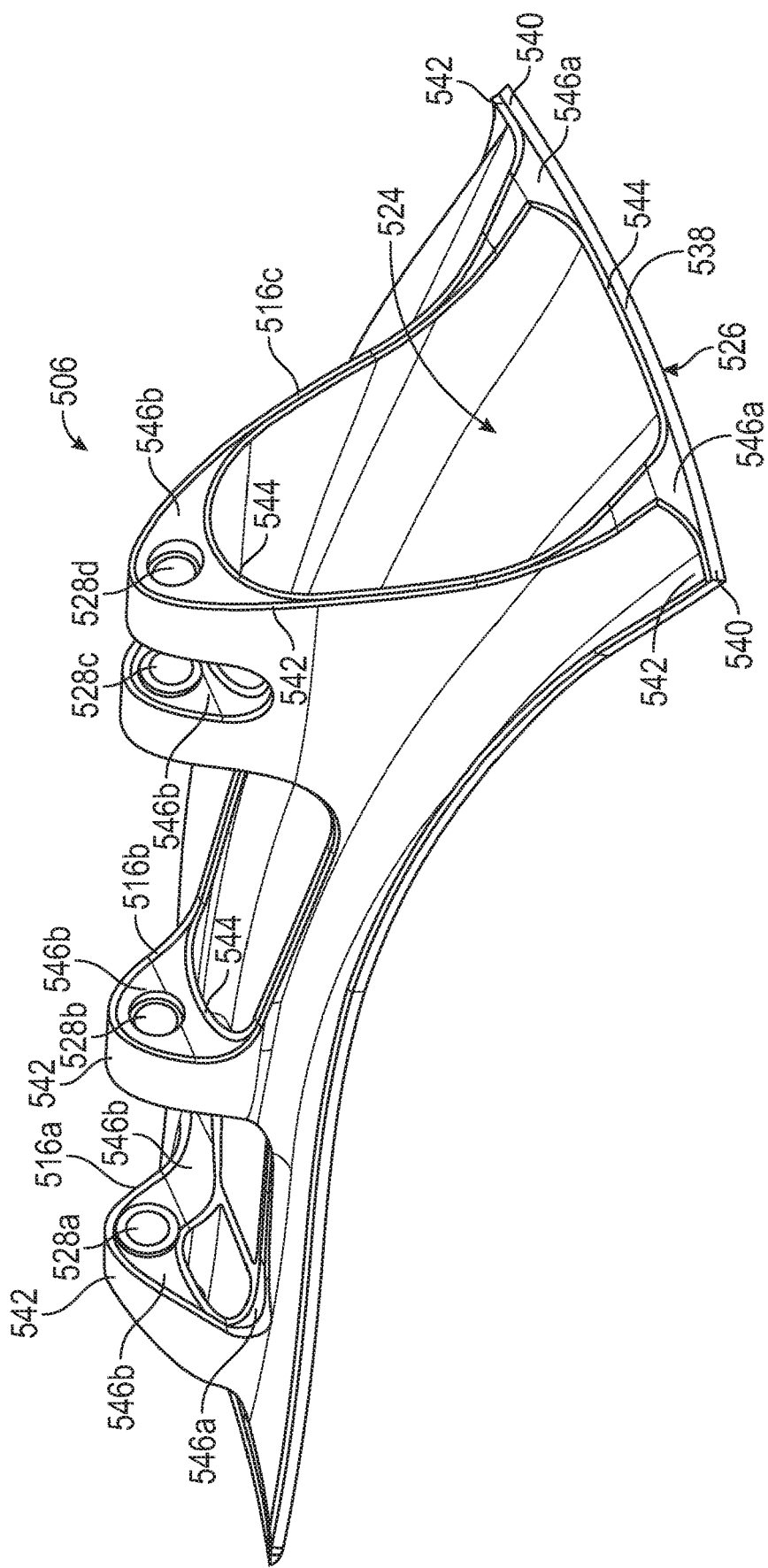
FIG. 5B is an isometric illustration of a platform as shown in FIG. 5A.

Turning now to FIGS. 5A-5B, schematic illustrations of a rotor disk assembly 500 of a gas turbine engine in accordance with an embodiment of the present disclosure are shown. FIG. 5A is side view (partial cross-section) of the rotor disk assembly 500 having a platform 506 attached to a rotor disk 502 and FIG. 5B is an isometric illustration of the platform 506 of FIG. 3A. The rotor disk assembly 500, as shown, includes the rotor disk 502, a blade 504, and a platform 506. The blade 504 may be a fan blade (e.g., for fan section 22 shown in FIG. 1) or a turbine blade (e.g., for a compressor section 24 or turbine section 28 shown in FIG. 1). Although shown with a single blade 504 and a single platform 506, those of skill in the art will appreciate that a number of blades and platforms are to be installed to the rotor disk 502 when installed into a gas turbine engine. Further, although a specific configuration and arrangement of elements is shown, those of skill in the art will appreciate that alternative arrangements are possible without departing from the scope of the present disclosure. That is, the present illustrations and discussion are merely for illustrative and explanatory purposes and are not intended to be limiting.

The rotor disk 502 includes a plurality of attachment lugs 508, with the blade 504 (and other blades) installed between adjacent attachment lugs 508, within a blade cavity (as discussed above). During installation of the fan section, the platform 506 is operably coupled to each of the attachment lugs 508. As shown, each of the attachment lug 508 may include one or more slots 512 that are configured to receive a portion of a respective platform 506. The attachment lug 508 may further include one or more lug apertures 536 for receiving a locking pin (as shown above). The locking pin may be used to provide removable attachment between the platform 506 and the attachment lug 508.

The platform 506 has a flow structure 538 defining a gaspath surface 526 and a non-gaspath surface 524 opposite thereto, similar to that described above. Extending radially inward (when installed to the rotor disk 502) from the flow structure 538 are a plurality of platform connectors 516a-c. Each platform connector 516a-c includes one or more securing elements 528a-d. In this non-limiting embodiment, a first platform connector 516a includes a first securing element 528a, a second platform connector 516b includes a second securing element 528b, and a third platform connector 516c includes third and fourth securing elements 528c-d. The particular arrangement of connectors and/or securing elements may be varied depending on the specific needs, blade configuration, and/or lug configuration. The securing elements 528a-d may be integrally formed with the respective platform connectors 516a-c, or may be separate elements (e.g., lug nuts). The securing elements 528a-d define apertures for receiving the locking pin, with the apertures of the securing elements 528a-d aligning with the lug apertures 536 to enable attachment of the platform 506 to the attachment lug 508 (e.g., as shown in FIG. 3B).

The connectors 516a-c extend from the non-gaspath surface 524 of the flow structure 538, as will be appreciated by those of skill in the art. The gaspath surface 526 may be contoured for specific flow characteristics within the gaspath of the gas turbine engine, as appreciated by those of skill in the art. Embodiments of the present disclosure are directed to the structure and manufacture of the flow structure, the connectors, and the securing elements of a platform.

FIG. 5B illustrates an isometric view toward the non-gaspath surface 524 of the platform 506. The platform 506 is formed from various elements, including a surface layer 540, an external layer 542, and an internal layer 544. Each layer 540, 542, 544 may be formed from one or more plies of material. Each ply forming a layer or part of a layer may be made from, for example, carbon fiber weaves and braids, carbon fiber unidirectional fabric, fiberglass weave, fiberglass unidirectional fabric, poly-paraphenylene terephthalamide (e.g., Kevlar) weaves and/or unidirectional fabric, synthetic polymers (e.g., thermoset liquid crystalline polyoxazole), etc. In some non-limiting embodiments, a single ply of material is used to form one or more of the layers 540, 542, 544. In other non-limiting embodiments, each layer 540, 542, 544 may comprise between four and seven plies. Those of skill in the art will appreciate that any number of plies may be employed to form the layers 540, 542, 544, which may be dependent on various requirements, thickness of plies, material characteristics of the ply materials, etc.

The layers 540, 542, 544 are wrapped about or relative to one or more support bodies 546a, 546b. In some embodiments, the support bodies 546a, 546b may be separate elements that are arranged during manufacture to enable layup and/or wrapping of the layers 540, 542, 544. In other embodiments, the support bodies 546a, 546b may be a unitary structure that is cut, machined, or otherwise worked to form the structure described herein. In one non-limiting example, the support bodies 546a, 546b are a pre-molded structure, with the layers 540, 542, 544 wrapped about the support body structure. Subsequently, the wrapped support body structure can be machined or cut to form the configuration shown in FIGS. 5A-5B. The support bodies 546a, 546b may be formed from, for example, carbon fiber tows with a thermoset resin compound, fiberglass based chopped fiber with a thermoset resin compound (e.g., Bulk Molding Compound), carbon fiber based chopped fiber with a thermoset resin compound (e.g., Bulk Molding Compound), carbon fiber based discontinuous fiber with a thermoplastic or thermoset resin compound, carbon fiber or fiberglass injection molded compound, metallics (e.g., steel, aluminum, titanium), foams, pure thermosets or thermoplastic injection molded compounds, honeycomb core, etc.

The support bodies 546a, 546b may define or be configured to support an element to define securing elements 528a-d. That is, the support bodies 546a, 546b are configured to receive, engage with, and support a locking pin to securely attach the platform 506 to the rotor disk 502. In some embodiments, the support bodies 546a, 546b may receive a lug nut or similar separate component which is arranged to receive and engage with the locking pin. In other embodiments, the support body 546a, 546b are configured to directly receive and engage with the locking pin to secure the platform 506 to the rotor disk 502.

Figure 6A:
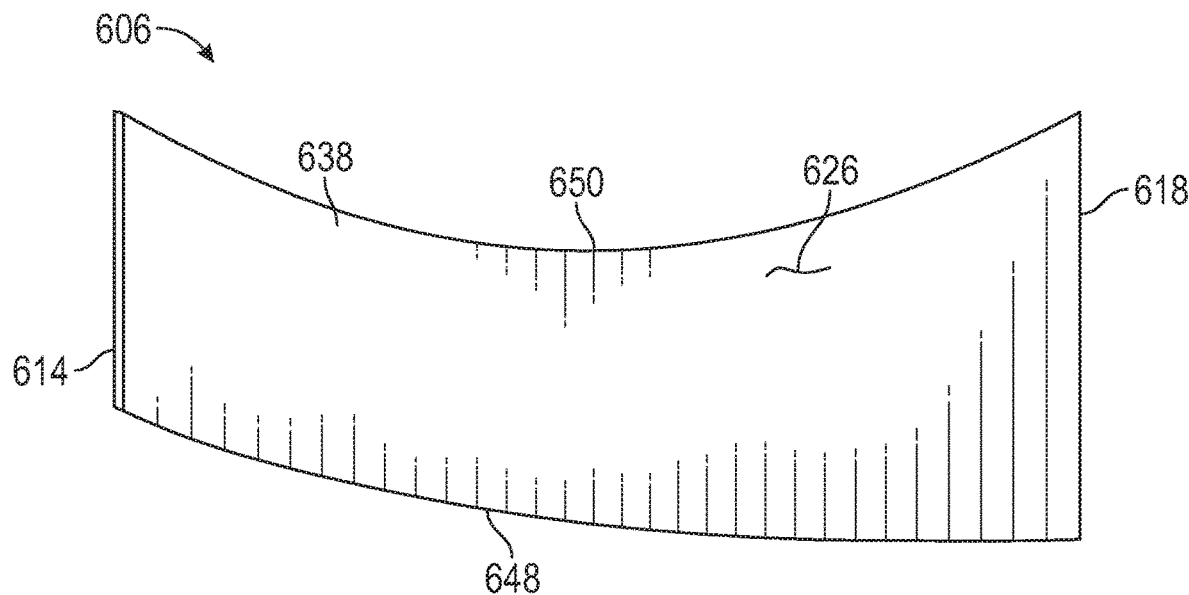
FIG. 6A is a top-down illustrative view of a gaspath surface of a platform in accordance with an embodiment of the present disclosure.
Figure 6B:
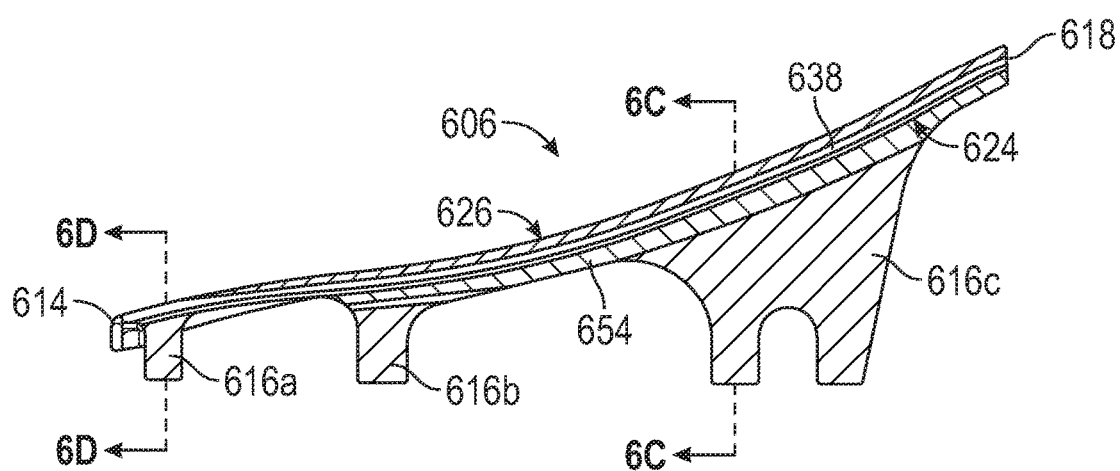
FIG. 6B is a side elevation view of the platform of FIG. 6A.
Figure 6C:
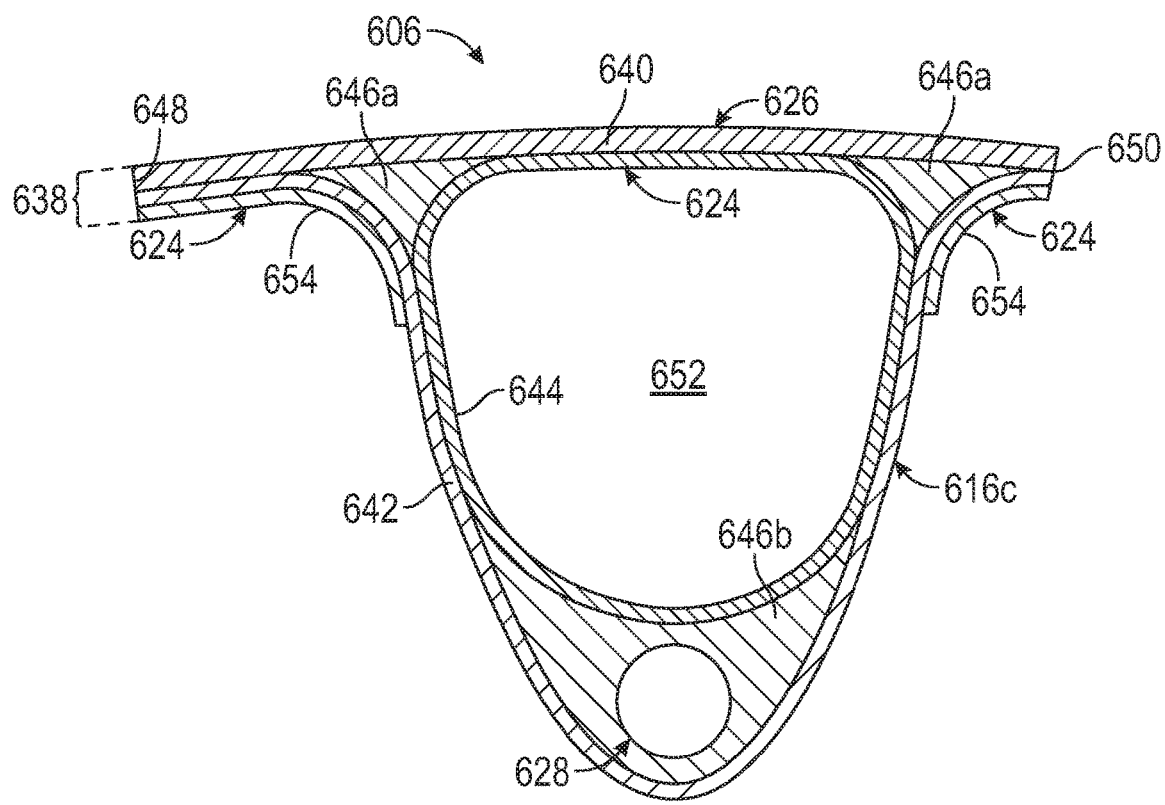
FIG. 6C is a cross-sectional illustration of the platform of FIG. 6A as viewed along the line C-C of FIG. 6B.
Figure 6D:
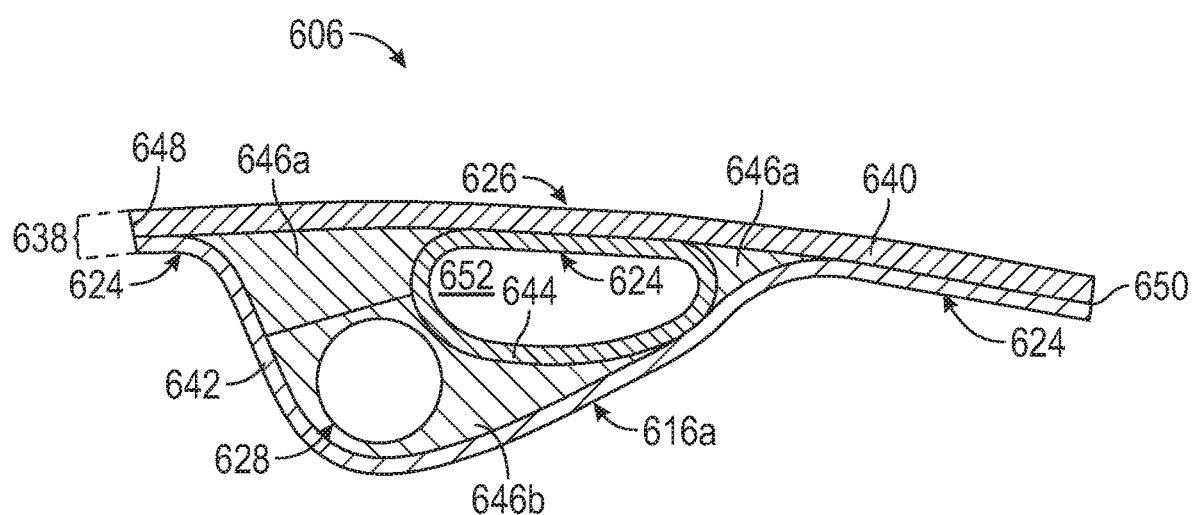
FIG. 6D is a cross-sectional illustration of the platform of FIG. 6A as viewed along the line D-D of FIG. 6B.

Turning now to FIGS. 6A-6D, schematic illustrations of a platform 606 in accordance with an embodiment of the present disclosure are shown. FIG. 6A is a top-down illustrative view of a gaspath surface 626 of the platform 606. FIG. 6B is a side elevation view of the platform 606. FIG. 6C is a cross-sectional illustration of the platform 606 as viewed along the line C-C of FIG. 6B. FIG. 6D is a cross-sectional illustration of the platform 606 as viewed along the line D-D of FIG. 6B.

The platform 606 has a flow structure 638 that defines a gaspath surface 626. Opposite the gaspath surface 626 is a non-gaspath surface 624. A plurality of platform connectors 616a-c extend from the non-gaspath surface 624 of the flow structure 638. The flow structure 638 extends between a front end 614 to a rear end 618 (in an axial direction when installed in a gas turbine engine). Furthermore, the flow structure 638 extends between a first platform edge 648 and a second platform edge 650 (in a circumferential direction when installed in a gas turbine engine). As shown, the first and second platform edges 648, 650 may be contoured or formed in a geometric shape (or linear) to form a desired platform geometry. Further, the gaspath surface 626 may have a curvature or geometry extending between the front end 614 and the rear end 618, such as to provide a desired flow characteristic during operation within a gas turbine engine. The platform edges 648, 650 may be machined or otherwise formed in a desired shape, contour, or geometry. The platform edges 648, 650, when the platform 606 is installed on a rotor disk, may form or define the surfaces of the platform 606 that interface with a blade. The platform edges may thus be machined for this purpose. Accordingly, the profile of the platform may be changed to conform to any desired blade geometry and/or profile.

The platform 606 is formed from a plurality of layers, similar to that shown and described above, which are wrapped, molded, or otherwise arranged about one or more support bodies. A first layer 640 forms and defines the gaspath surface 626. The first layer 640 is a non-continuous layer, formed from one or more plies. The first layer 640 extends between the first platform edge 648 and the second platform edge 650. It is noted that the first layer 640 terminates at the platform edges 648, 650 and does not wrap around the entire platform 606. That is, the first layer 640 is discrete from the other layers of the platform 606.

A second layer 642 forms and defines a portion of the non-gaspath surface 624. The second layer 642, similar to the first layer 640, is a non-continuous layer, formed from one or more plies. The second layer 642 extends between the first platform edge 648 and the second platform edge 650, and further defines part of the platform connectors 616a-c. Similar to the first layer 640, the second layer 642 terminates at the platform edges 648, 650 and does not wrap around the entire platform 606. That is, the second layer 642 is discrete from the other layers of the platform 606.

A third layer 644 forms and defines a portion of the non-gaspath surface 624. The third layer 642, unlike the first and second layers 640, 642, is a continuous layer, formed from one or more plies, and defines an internal void 652 of the platform 606. The internal void 652 may be provided to ensure reduced weight of the platform 606. Because the third layer 644 is a continuous layer, the third layer does not have defined ends. The third layer 644 is discrete from the other layers of the platform 606.

Arranged between the layers 640, 642, 644 are one or more support bodies 646a, 646b. The support bodies 646a, 646b may be separate and distinct structures or may be parts of a unitary or single body. A first support body 646a is arranged between the first layer 640, the second layer 642, and the third layer 644 proximate the gaspath surface 626 and form a part of the flow structure 638. The first support body 646a, in this illustrative embodiment, are formed as deltoids, and separate each of the layers 640, 642, 644 proximate the gaspath surface 626. The geometric shape of the first support body 646a is such that the radii of surfaces along which the various layers 640, 642, 644 contact are shallow and broad enough to prevent sharp angles, thereby reducing or eliminating rises in stresses experienced by the plies of the layers 640, 642, 644. A second support body 646b is arranged away from the flow structure 638 and defines, in part, the platform connectors 616a-c. The second support body 646b is arranged between the second layer 642 and the third layer 644. Further, the second support body 646b defines, supports, or contains securing elements 628, which are configured to receive a locking pin, as described above. The support bodies 646a, 646b can transition from be separated at the rear end 618 (e.g., as shown in FIG. 6C), to merging into a single body, or being connected, at the front end 614 (e.g., as shown in FIG. 6D). As shown in FIG. 6D, the first and second support bodies 646a, 646b form a single support body that includes both the deltoid aspect (separating the various layers) and also contains the securing element 628 at the front end 614 of the platform 606.

Also show, the platform 606 can include one or more optional sealing layers 654. The sealing layers 654 may be distinct layers of one or more plies that are attached to the second layer 642 and positioned along and define part of the non-gaspath surface 624. The sealing layers 654 may be arranged proximate the platform edges 648, 650 and define contact surfaces for engagement with a seal (e.g., a flap seal) that is arranged between the platform 606 and an adjacent blade. As shown, the sealing layers 654 not only do not extend from one platform edge to the other platform edge, but the sealing layers 654 also do not extend completely between the front end 614 and the rear end 618 of the platform 606. In some embodiments, the sealing layers 654 may be sacrificial layers that are arranged to be worn by contact with the seal. Accordingly, the sealing layers 654 may provide protection to the second layer 642 of the platform 606.

In accordance with various embodiments, and as may be appreciated by those of skill in art, an injected resin will hold the layers together. Further, such injected resin will act as a glue between the layer-to-support body. In some embodiments, an adhesive paste or adhesive film may be provided to hold the layer-to-support body. However, as will be appreciated by those of skill in the art, the layer-to-layer bonding will be achieved using the resin.

As described above, the cross section of the composite structure platform of the present disclosure contains a center continuous layer (e.g., ply wrap) and two separate non-continuous layers (e.g., ply wraps) on the outside. The layers are divided by material of the support bodies (e.g., filler) in the corners designed to reduce interlaminar effects. The support bodies, in some embodiments, are pre-molded pieces that act as part of the tooling during a layup process. The bottom support body is designed to receive the pin, and may be formed from an appropriate material that is strong enough to withstand loading from a locking pin. The upper support bodies, or deltoids, are designed to separate all the ply wraps near the flow path. The radii of the support bodies may be shallow and broad enough to prevent sharp angles, thereby causing rises in stress. As noted, the external layers (e.g., first and second layers discussed above) terminate at the edges of the platform. These layers are composed of separate ply packs and do not continue around the edges of the platform. The internal layer (e.g., third layer discussed above) is a continuous wrap of a ply or plies.

Figure 7:
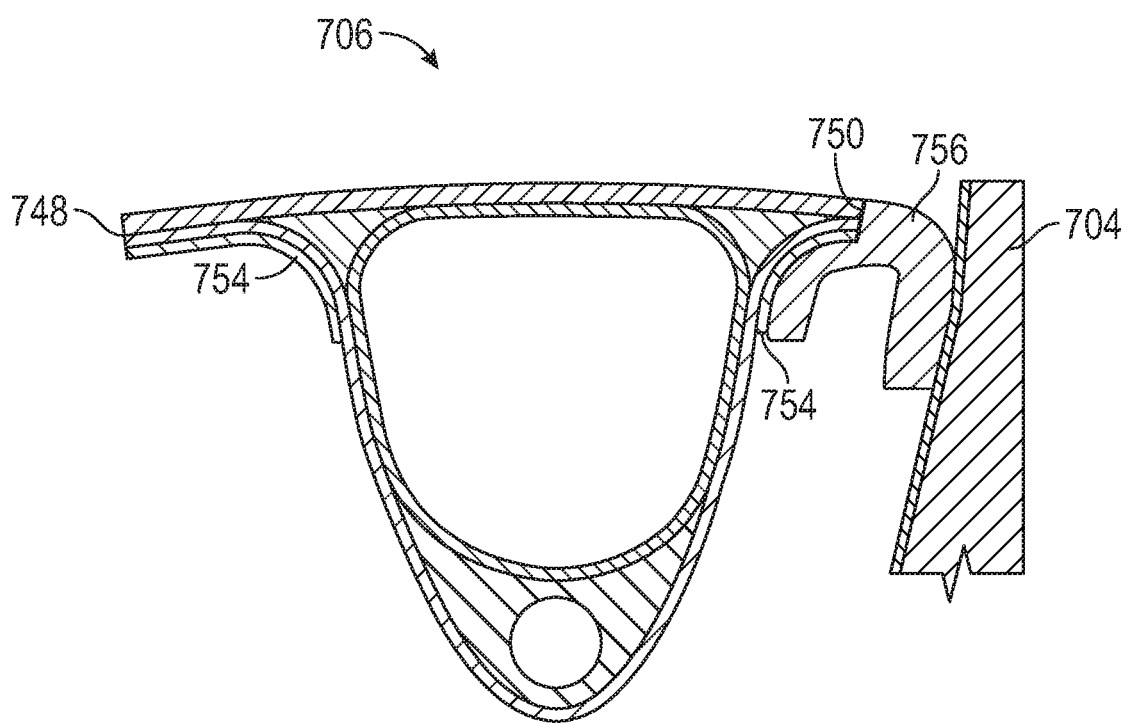
FIG. 7 is a schematic illustration of a platform in accordance with the present disclosure as arranged relative to a fan blade of a gas turbine engine.

Turning now to FIG. 7, a schematic illustration of a platform 706 in accordance with the present disclosure as arranged relative to a flap seal 756 for a fan blade 704 of a gas turbine engine is shown. The platform 706 may be substantially similar to that shown and described above, and thus detail thereof may be omitted herein. In FIG. 7, the platform 706 is arranged adjacent to and in contact with the flap seal 756 of for a fan blade 704. As shown, a sealing layer 754 is positioned along and defines part of the non-gaspath surface of the platform. The sealing layer 754 is arranged proximate a platform edge 750 and defines a contact surface for engagement with the flap seal 756 that is arranged between the platform 706 and the adjacent blade 704. As shown, the sealing layer 754 does not extend from one platform edge 750 to the other platform edge 748. Rather, the sealing layer 754 is only located and positioned proximate a respective platform edge 748, 750. In some embodiments, the sealing layer 754 may be a sacrificial layer that is arranged to be worn by contact with the seal. Accordingly, the sealing layers 754 may provide protection to the other layers of the platform 706.

In some embodiments, the flap seal is a rubber piece that is configured to affix to the platform 706 and then engage with a surface of the blade 704. The flap seal 756 is bonded to the edge 750 of the platform 706 and bends into shape against the fan blade 704. The sealing layer 756 may be a layer that can be abraded and epoxy bonded to attach or otherwise affix the flap seal 756 to the platform 706.

Advantageously, embodiments of the present disclosure provide for improved platform construction as compared to typical platforms for gas turbine engines. For example, embodiments of the present disclosure can provide a large reduction of interlaminar effects for small composite components which are inertial loaded at high angular velocities. Further, advantageously, a large reduction of stresses may be achieved which in turn can lead to weight reduction of the platforms. Furthermore, more consistent aero performance over a wide range of RPMs can be provided due to the higher part stiffness. Further, because of the machining of the edges, the pre-molding of the support bodies, etc., there may be fewer design constraints for the hub (rotor disk) due to increased design flexibility for the platform. Additionally, non-conventional cross sectional shapes and geometries may be enabled that utilize the non-continuous ply wraps with deltoid support bodies. Further, advantageously, the sealing layers can provide a seal bond line that has a preferred loading direction, in concert with the machining of the edges of the platform.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A platform for a gas turbine engine, the platform comprising:
   a flow structure defining a gaspath surface and a non-gaspath surface, the flow structure extending between a front end and a rear end and between a first edge and a second edge;
   a platform connector extending from the non-gaspath surface;
   a first layer forming a part of the flow structure including the gaspath surface, the first layer being a non-continuous layer terminating at the front end, the rear end, the first edge, and the second edge;

a second layer forming a part of the flow structure and a part of the platform connector, the second layer being a non-continuous layer terminating at the front end, the rear end, the first edge, and the second edge, wherein the second layer contacts the first layer proximate the first and second edges; and a third layer forming a part of the flow structure and defining an internal void, the third layer being a continuous layer arranged between the first layer and the second layer, wherein the third layer contacts the first layer to define a part of the flow structure, and the third layer contacts the second layer to define a part of the platform connector.

2. The platform of claim 1, wherein at least one of the first layer, the second layer, and the third layer comprises one or more plies of material.

3. The platform of claim 2, wherein the plies of material comprises at least one of carbon fiber weave, carbon fiber unidirectional fabric, fiberglass wave, fiberglass unidirectional fabric, poly-paraphenylene terephthalamide weaves and/or unidirectional fabric, synthetic polymers.

4. The platform of claim 1, further comprising at least one support body arranged between at least two of the first layer, the second layer, and the third layer.

5. The platform of claim 4, further comprising a support body arranged between each of the first layer, the second layer, and the third layer and forming part of the flow structure.

6. The platform of claim 4, further comprising a support body arranged between the second layer and the third layer, wherein the support body forms a part of the platform connector.

7. The platform of claim 6, wherein the support body includes a securing element configured to receive a locking pin.

8. The platform of claim 4, further comprising a first support body arranged between each of the first layer, the second layer, and the third layer and forming part of the flow structure, and a second support body arranged between the second layer and the third layer.

9. The platform of claim 8, wherein the first support body and the second support body are separate from each other at the rear end of the flow structure and are joined at the front end of the flow structure.

10. The platform of claim 9, wherein the first support body and the second support body are a single unitary element that separates in a direction from the front end to the rear end.

11. The platform of claim 4, wherein the at least one support body is formed of at least one of carbon fiber tows with a thermoset resin compound, fiberglass based chopped fiber with a thermoset resin compound (e.g., Bulk Molding Compound), carbon fiber based chopped fiber with a thermoset resin compound (e.g., Bulk Molding Compound), carbon fiber based discontinuous fiber with a thermoplastic resin compound, carbon fiber or fiberglass injection molded compound, metallics (e.g., steel, aluminum, titanium), foams, pure thermosets or thermoplastic injection molded compounds, and a honeycomb core.

12. The platform of claim 1, further comprising at least one sealing layer attached to the second layer along a portion of at least one of the first edge and the second edge.

13. The platform of claim 12, wherein the at least one sealing layer does not extend an entire length from the front end to the rear end and does not extend an entire length from the first edge to the second edge.

14. A gas turbine engine comprising:
a rotor disk;
an airfoil installed to the rotor disk; and
a platform installed to the rotor disk adjacent the airfoil, the platform comprising:
a flow structure defining a gaspath surface and a non-gaspath surface, the flow structure extending between a front end and a rear end and between a first edge and a second edge;
a platform connector extending from the non-gaspath surface, the platform connector arranged to engage with the rotor disk;
a first layer forming a part of the flow structure including the gaspath surface, the first layer being a non-continuous layer terminating at the front end, the rear end, the first edge, and the second edge;
a second layer forming a part of the flow structure and a part of the platform connector, the second layer being a non-continuous layer terminating at the front end, the rear end, the first edge, and the second edge, wherein the second layer contacts the first layer proximate the first and second edges; and
a third layer forming a part of the flow structure and defining an internal void, the third layer being a continuous layer arranged between the first layer and the second layer, wherein the third layer contacts the first layer to define a part of the flow structure, and the third layer contacts the second layer to define a part of the platform connector.

15. The gas turbine engine of claim 14, wherein at least one of the first layer, the second layer, and the third layer comprises one or more plies of material.

16. The gas turbine engine of claim 14, further comprising at least one support body arranged between at least two of the first layer, the second layer, and the third layer.

17. The gas turbine engine of claim 16, wherein the at least one support body includes a securing element configured to receive a locking pin.

18. The gas turbine engine of claim 16, further comprising a first support body arranged between each of the first layer, the second layer, and the third layer and forming part of the flow structure, and a second support body arranged between the second layer and the third layer.

19. The gas turbine engine of claim 18, wherein the first support body and the second support body are separate from each other at the rear end of the flow structure and are joined at the front end of the flow structure.

20. The gas turbine engine of claim 19, wherein the first support body and the second support body are a single unitary element that separates in a direction from the front end to the rear end.

* * * * *